United States Patent [19]

Greenberg

[11] Patent Number: 5,706,128
[45] Date of Patent: Jan. 6, 1998

[54] STEREO MICROSCOPE CONDENSER

[75] Inventor: Gary Greenberg, Los Angeles, Calif.

[73] Assignee: Edge Scientific Instrument Company LLC, Los Angeles, Calif.

[21] Appl. No.: 846,412

[22] Filed: Apr. 30, 1997

Related U.S. Application Data

[63] Continuation of Ser. No. 526,400, Sep. 11, 1995, abandoned.

[51] Int. Cl.$^6$ .................. G02B 21/06; G02B 26/02
[52] U.S. Cl. ................. 359/385; 359/227; 359/234; 359/368
[58] Field of Search .................. 359/376, 377, 359/378, 384, 391, 394, 368, 369, 370, 371, 385, 381, 386, 388, 227, 232, 233, 234, 235, 236; 351/213, 214, 215, 217, 233, 234, 216

[56] References Cited

U.S. PATENT DOCUMENTS

| | | | |
|---|---|---|---|
| 2,255,631 | 9/1941 | Schulman | 359/386 |
| 2,404,888 | 7/1946 | Richards | 359/234 |
| 2,825,263 | 3/1958 | Dockhorn | 359/233 |
| 3,417,685 | 12/1968 | Kato et al. | |
| 4,407,569 | 10/1983 | Piller et al. | 359/388 |
| 4,756,611 | 7/1988 | Yonekubo et al. | 359/388 |
| 5,128,808 | 7/1992 | Dosaka | 359/821 |

Primary Examiner—Thong Nguyen
Assistant Examiner—Mark A. Robinson
Attorney, Agent, or Firm—H. Michael Brucker

[57] ABSTRACT

A condenser for a transmitted light microscope with built-in 3-D filters and stereo pair photo apertures that permit a standard 2-D microscope, high power as well as low power, to produce a variety of high quality 3-D images and photos.

25 Claims, 6 Drawing Sheets

STEREO MICROSCOPE CONDENSER

This application is a continuation of application Ser. No. 08/526,400 filed on Sep. 11, 1995, now abandoned.

The present invention relates to transmitted light microscopes generally and more particularly to an improved condenser lens system for a microscope which incorporates means for stereo viewing and stereo pair photographing. The condenser of the present invention permits a standard 2-D microscope, high power as well as low power, to produce direct 3-D viewing as well as a variety of high quality 3-D images and photos.

The ability to view a specimen under a microscope in 3-D (stereo viewing) provides a fuller understanding of the relative position of the various components of the specimen. That is to say, a 2-dimensional view of an specimen under a high powered microscope does not reveal which components of the specimen are in the foreground and which are in the background, a determination which can be critical in many investigations.

Microscopes capable of viewing a specimen in 3-D have been known for many years and are available commercially. Such 3-D microscopes, however, are generally limited to low power microscopes (less than 100× magnification) and are commonly 3-D dedicated and restricted to a single 3-D view.

In the real world, microscope specimens are three-dimensional objects, but conventional research microscopes produce two-dimensional images. A great deal of information is lost in the process of projecting the image of a three-dimensional object onto a two-dimensional space. Two-dimensional projections can produce artifacts and may lead to erroneous interpretations about structures within the specimen. In an attempt to overcome these problems microscopes traditionally have been designed for viewing thin specimens, and consequently, researchers have designed their experiments for observing such unworldly specimens. However, with thin specimens, there is a loss of information regarding interrelationships with adjacent structures not present within the sample being viewed.

Since the time of Cajal scientists have modified conventional microscopes in order to view and record 3D images (CaJal SA, 1910, Obtencion de estereofotografias con un solo objectivo de gran abertura. Anal Soc EspFis Quim 73:3–12). This can be achieved in a number of different ways, for example, by tilting the specimen on a specially constructed goniometer stage and sequentially photographing the left-tilted and right-tilted views (Ref. Shaw Pj,1990, Three-dimensional optical microscopy using tilted views. *J Microsc* 158: 165–172. Bradl J, Hausmann M, Ehemann V, Komitowski D, Cremer C, 1992, A tilting device for three-dimensional microscopy: application to in situ imaging of interphase nuclei. *J Microsc* 168:47–57). Some methods involve obscuring the left half of the objective aperture to create a right-eye view, followed by obscuring the right half of the objective aperture for the left-eye view (Ref. Inoue S, 1986, *Video Microscopy*. Plenum Press New York). Other methods involve obscuring, sequentially, the left and right halves of the condenser aperture in order to produce left and right images for a stereo pair (Ref. Galbraith W, 1957, A method for high-power stereoscopic microscopy. *Q J Microsc Sci* 98:9–13). Yet another method involves the sequential decentering of the microscope lamp filament from the left side to the right side (Teunis PF, Bretschneider F, Machemer H, 1992, Real-time three-dimensional tracking of fast-moving microscopic objects. *J Microsc* 168:275–288). Finally, simple polarizing filters (or complementary colored filters) can be used to convert a conventional microscope into a real-time 3D microscope (Inoue, 1986). Although a number of different arrangements for single lens stereo exist, they are not widely used, possibly because of the difficulty experienced in setting up and using such arrangements.

The present invention is directed to a microscope condenser lens (high power as well as low power) for use on conventional laboratory and research microscopes primarily intended for 2-D observations. The invention expands the function of such microscopes to include the ability to produce a variety of 3-D images and capture those images in stereo pair photos or as a two color anaglyph photo. An investigator using a standard microscope equipped with the condenser of the present invention can quickly and easily produce a variety of different 3-D images of a specimen which may differ significantly one from the other in terms of increased stereo parallax, image contrast and depth of field.

Further, the invention provides means which facilitate making a stereo pair photograph of any viewed 3-D image.

In its simplest form, the present invention incorporates into a condenser lens for a transmitted light microscope means which permits different "screens" to be disposed at or very near the rear aperture of the condenser. As used herein and throughout, the term "screen" includes any light passing aperture in an otherwise opaque carrier. Such apertures can be open without any material (other than air) within its boundaries, or they can define the boundary for light transmissive materials of any variety. These screens include polarizing and/or chromatic filters as well as apertures which merely occlude a portion of the rear aperture of the condenser lens (prevent an incident light beam from passing to the rear aperture).

The term "through-aperture" as used herein shall mean any screen that permits a light beam to pass essentially without modification other than beam size. Thus, a through-aperture allows a light beam to pass through without changing the character of the light, and is distinguished from a filter which does change the character (e.g., color or polarization) of light that passes through it.

In one embodiment of the invention these screens are mounted on a circular disk carrier which can be rotated to selectively present different screens at the rear aperture of the condenser. In another embodiment of the invention the screens are on slide carriers capable of linear movement through which different screens are aligned with the rear aperture of the condenser lens. In this latter embodiment multiple slides can be stacked, one over the other, to permit a wide variety of different screens to be readily available to the investigator. In the stacked embodiment of the invention, one of the screens included in each slide is a through-aperture approximately the same size as the rear aperture of the condenser lens which permits a light beam to pass without being reduced in size or changed in character. The disk embodiment, as well as the slide embodiment, of the invention can also advantageously include a screen which is a through-aperture approximating the size of the rear aperture of the condenser lens in order to permit standard 2-D viewing.

Thus, an investigator using a microscope with a condenser lens of the present invention, can without the need for changing lenses or dismantling the microscope readily observe an object in 2-D or any one of a variety of different 3-D views.

3-D viewing with the present invention necessitates the use of polarizing or chromatic filters thus making it necessary for a complementary set of filters to be incorporated into the binocular viewing system of the microscope. In the case of chromatic filtering, this simply entails providing each eye piece with a filter corresponding to the chromatic filter being inserted at the aperture of the condenser lens by the present invention. In the case of polarizing filters, however, it is critical that the filters at the eye-pieces be properly aligned in order to produce the desired 3-D viewing effect. The present invention provides simple means for achieving the proper alignment of the eye piece filters relative to the filters at the condenser lens.

In addition to the above, the present invention achieves 3-D images using polarizing filters in a microscope having a binocular viewing head which uses prisms to permit adjustments for interoccular spacing.

Accordingly, it is an object of the present invention to provide a condenser lens for a transmitted light microscope which permits convenient specimen (object) viewing and photographing in 3-D.

It is another object of the present invention to provide a condenser lens for a transmitted light microscope which permits a variety of different 3-D views of a specimen and the ability to sample each such view with ease.

It is yet a further object of the present invention to provide a condenser lens for a transmitted light microscope having the features mentioned above as well as the ability to readily take a stereo pair photograph of any 3-D view seen by the investigator using the microscope.

Yet another object of the invention is to provide a condenser lens for a transmitted light microscope which produces 3-D images using polarizing filters which can be viewed by a head which has adjustable interoccular spacing.

BRIEF DESCRIPTIONS OF THE DRAWINGS

The foregoing and other objects, aspects and advantages of the invention will be better understood from the following detailed description of preferred embodiments of the invention with reference to the drawings in which.

DETAILED DESCRIPTION OF THE INVENTION

Figure 1:
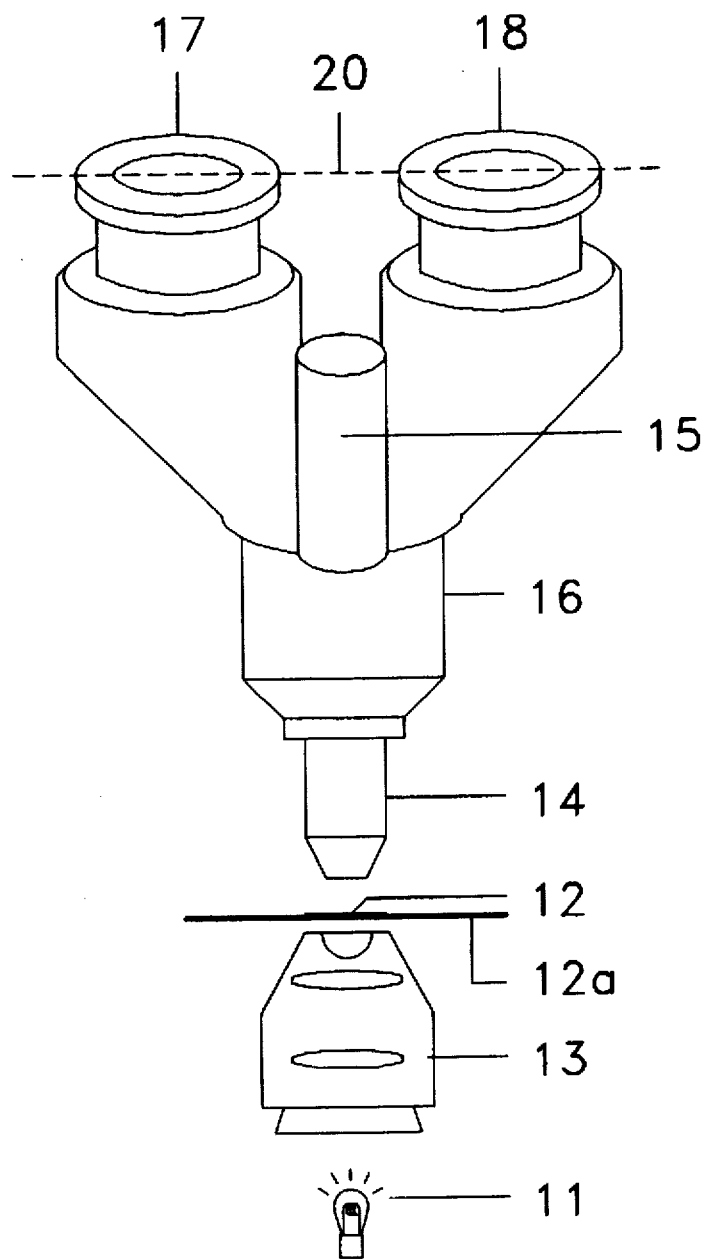
FIG. 1 is a perspective, schematic illustration of the main components of a typical transmitted light microscope having binocular viewing and interoccular adjustable spacing.

Referring to FIG. 1, the primary components of a standard transmitted light microscope are a light source 11, for illuminating an object (specimen) 12 at a stage 12a, a condenser lens 13, an objective lens 14, and a binocular viewing head 16 that includes a pair of spaced-apart eyepiece lenses 17 and 18, the centers of which lay on an imaginary line 20. The binocular viewing head 16 may also include a system which allows for interoccular adjustability (not shown in detail but indicated generally at 15).

The various lenses (13, 14, 17 and 18) are illustrated schematically and it will be understood by those skilled in the art that condenser lenses, objective lenses and eyepiece lenses can, and usually do, comprise a number of different optical elements including multiple lenses. As will be explained in greater detail below, the present invention is not restricted to microscopes having single lens objectives, condensers or eye pieces, but operates as well on more sophisticated systems using lenses having multiple elements.

Figure 2:
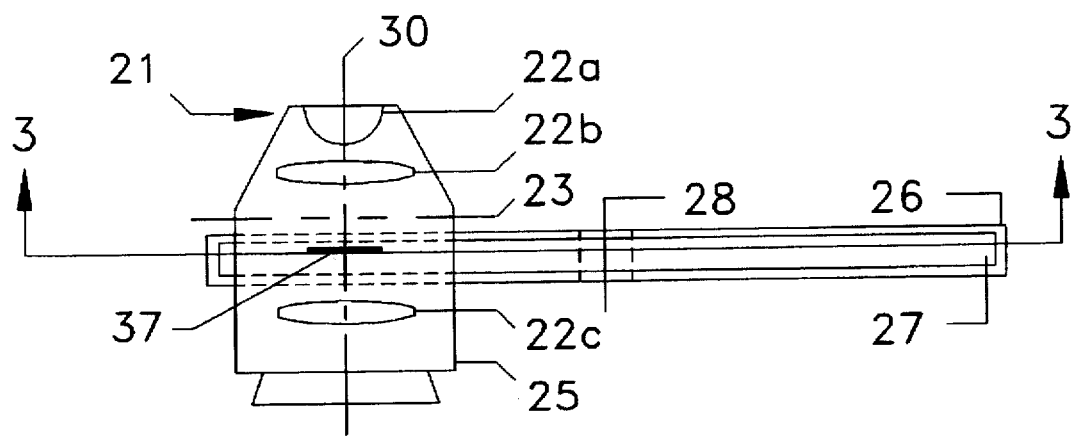
FIG. 2 is a mostly schematic side view illustration of a condenser lens of the present invention incorporating a disk carrier.
Figure 3:
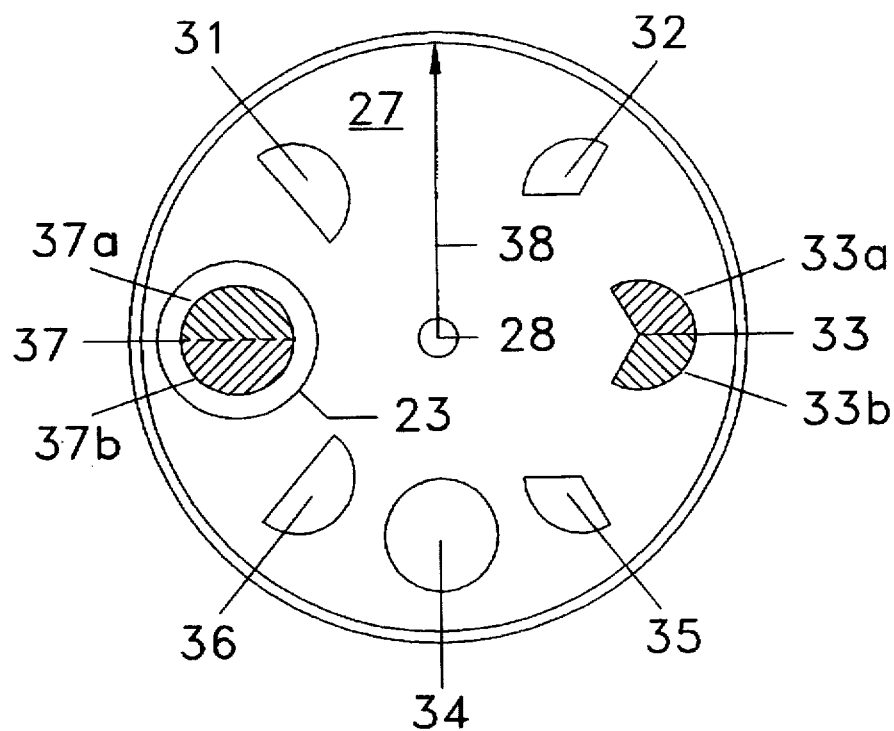
FIG. 3 is a sectional view of the condenser and disk carrier of FIG. 2 taken along the line 3—3 of FIG. 2, showing a variety of different screens in relation to the condenser rear aperture.

Referring to FIGS. 2 and 3, a transmitted light microscope condenser 21, is comprised of a plurality of optical elements 22a, 22b, and 22c supported within a condenser housing 25 and all sharing a common optical axis 30. The rear aperture of the condenser is indicated at 23 between elements 22b and 22c and with an optical axis coincident with optical axis 30.

Integral with the condenser housing 25 is a carrier housing 26 in which an opaque carrier disk 27 is rotatably supported about an axis 28. The disk axis 28 is parallel to the optical axis 30 but spaced therefrom a distance less than the length of radius 38 of the disc 27 and preferably between one third and two thirds the length of radius 38. The carrier disk 27, which lies in a plane generally perpendicular to the axis 30, includes a plurality of screens 31-37.

Screen 37, as shown in FIG. 3, is aligned with the rear aperture 23 of the condenser lens 21 whereby any light directed toward the rear aperture 23 of the condenser 21 will pass through the screen 37. Rotation of disk 27 about the axis 28 permits any one of the screens 31-37 to be aligned with the aperture 23 and thereby interposed in the path of any light beam that is directed at the condenser rear aperture 23.

Screens 31, 32, 34, 35, and 36 are all through-apertures in the opaque disk 27 which permit all or a portion of a light beam to be transmitted from the light source 11 (see FIG. 1) to the rear aperture 23 as it passes through the condenser 21. Other than possibly blocking a portion of a beam from passing through the condenser 21, the through-apertures do not otherwise change the character of the light passing through the condenser 21. Screens 33 and 37, on the other hand, are filters disposed in the opaque disk 27, which operate to change the character of light which passes through them. Screen 34 is a circular through-aperture in the opaque disk 27 which when aligned with the rear aperture 23 of lens 21 permits a full beam of light to pass unaltered through the condenser 21. The use of screen 34 is for normal 2-D viewing.

For 3-D viewing, disc carrier 27 is rotated until there is alignment between either screen filter 33 or screen filter 37 and the rear aperture 23 of condenser 21. Filter 37 is made up of a half circular filter 37a and a half circular filter 37b, which are joined along a diameter and which together form a circle. Filters 37a and 37b are complementary filters, such as a chromatic pair (red and green, for example) or a polarizing pair (polarizing filters positioned 90° to one another). As is well known in the art, half-aperture filters such as filters 37a and 37b can produce 3-D viewing when the binocular viewing system is provided with corresponding filters. A light beam passing through different halves of such a filter pair is divided in two contrastable beams whereby the individual eye-pieces see light from different areas of the condenser rear aperture. The result is that each eyepiece 17 and 18 sees a slightly different view of the specimen 12. This creates the parallax necessary for 3-D viewing.

If, as is often the case, it is desired to take a stereo pair photograph of a viewed 3-D image, this can be easily accomplished with the present invention by use of the through-aperture screens 31 and 36 which have the same geometric shape as the individual filters 37a and 37b.

By rotating the disk 27 about its axes 28, half-aperture screen 31 can be quickly positioned to align with rear aperture 23 to replace filter screen 37a and a photograph taken through that half aperture. The half-aperture 36 can then be quickly and easily positioned to align with the rear aperture 23 and the second of the stereo pair photographs taken. By these simple steps a 3-D stereo pair photograph is taken of the viewed stereo image without having to change lenses or institute some other cumbersome arrangement.

The art of microscope photography is so well known that it is not necessary to describe that process. Those skilled in the art will immediately understand how the through-apertures are used to produce stereo pair photographs.

In addition to the half-aperture screen filter 37, the opaque disk 27 further includes a 3-D filter screen 33 comprised of a pair of filters 33a and 3b having the geometric shape of a sector of a circle. Sector filters 33a and 3b are aligned along a common radii. The geometry of screen filter pair 33 can provide an image with greater contrast and depth of field than that seen using half circle screen filter pair 37 and thus produce a more useful image for certain specimens.

The present invention permits an investigator to quickly and easily view a specimen with any of the 3-D viewing screens on the disk 27 (in this case screens 37 and 33) to see which produces the more useful image for the specimen being observed. Through-aperture screen 32 has the same geometric shape as filter 33a, while through-aperture screen 35 has the same geometric shape as filter 33b. If it is determined that the best 3-D view is achieved using the filter screen pair 33, for example, then apertures 32 and 35 can be used to take a stereo pair photograph in the same way as described with reference to half-circle screens 31 and 36. The benefits of the present invention are that it requires only the adjustment of disc 27 to view and/or photograph a specimen in a high power conventional microscope, while the cumbersome arrangements described in the literature are eliminated.

Other geometries for 3-D filters are possible and advantageous for different specimens as will be more fully described below. The invention is not limited to any particular geometry of filter screen pairs. In order to be able to produce a stereo pair photograph of any viewed 3-D image however, it is advantageous to provide corresponding through-aperture screens of the same geometry as each one of the filters that make up the filter pair, and each such through-aperture screen must be situated on the carrier disk 27 so that each can be individually and sequentially aligned with the condenser rear aperture in a quick and simple manner.

When it is desirable to view the specimen as through a standard condenser, through-aperture 34 is aligned with the rear aperture 23 and the microscope produces a standard 2-D image, once again, without any lens change being required or some other cumbersome arrangement being instituted.

The present invention, for the first time, provides an investigator utilizing a transmitted light microscope with the ability to quickly and easily observe a specimen with a variety of views including a variety of 3-D views and to easily create a stereo pair photograph of any view observed. All of this is achieved without changing any lenses or dismantling the microscope in any way whatsoever, as would be required with prior art systems.

Figure 4:
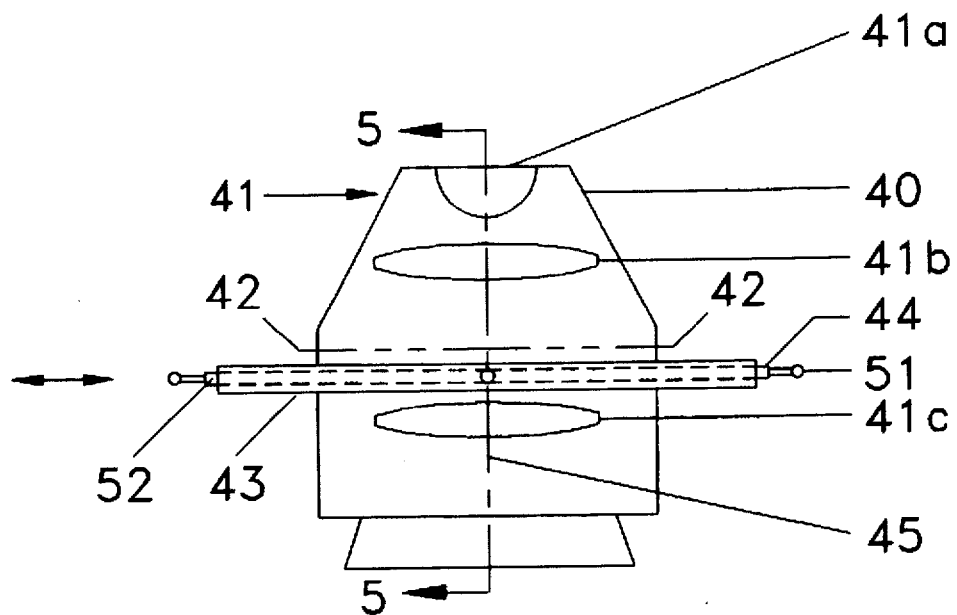
FIG. 4 is a mostly schematic side view illustration of a condenser lens of the present invention incorporating a slide carrier.
Figure 5:
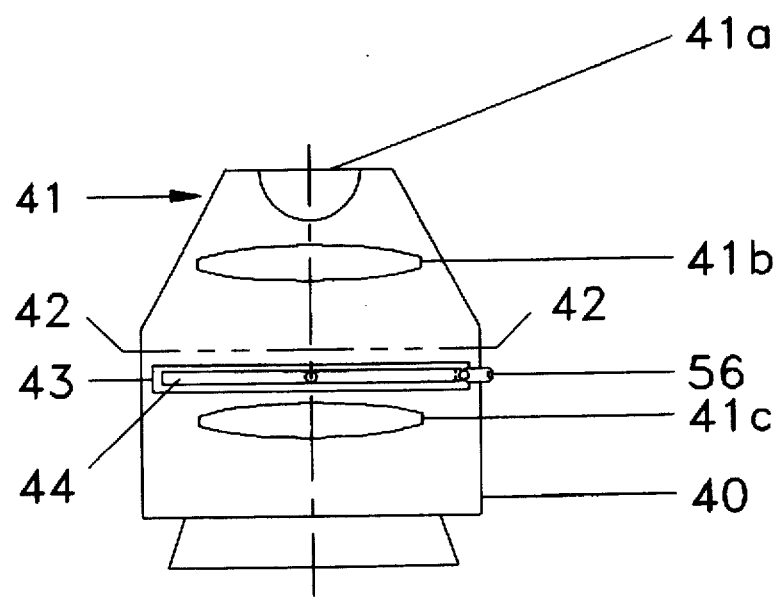
FIG. 5 is a section view of the condenser lens and carrier of the present invention taken along the line 5—5 of FIG. 4.
Figure 8:
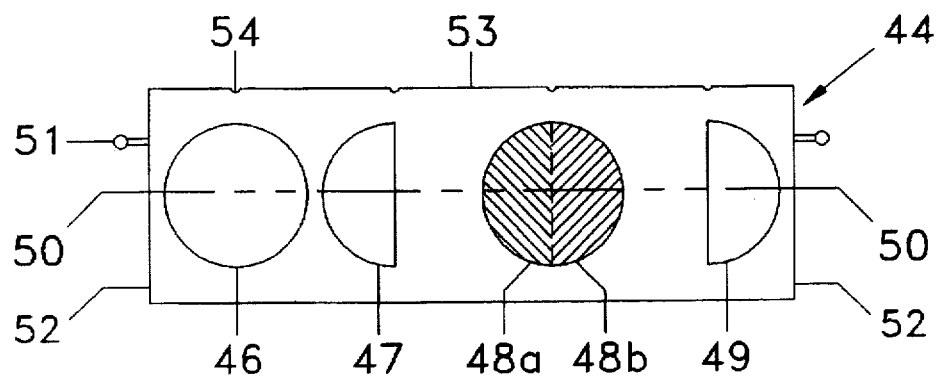
FIG. 8 is a plan view of a carrier slide for use with the condenser of FIG. 6, having a plurality of screens.

Referring to FIGS. 4, 5 and 8, a transmitted light microscope condenser 41, is comprised of a plurality of optical elements 41a, 41b, and 41c having a common optical axis 45 supported within a condenser housing 40. The rear aperture of the condenser is indicated at 42 between elements 41b and 41c and also has an optical axis 45.

Integral with the condenser housing 40 is a generally rectangular carrier housing 43, which slidably supports an opaque generally rectangular screen slide 44 which includes a plurality of screens 46–49. The generally rectangular slide 44 is slightly longer in its longitudinal dimension than the housing 43 and can advantageously have a handle 51 attached at each of the end edges 52. Formed in one of the longitudinal edges 53, are indexing detentes 54 which interact with a detente cam 56 attached to carrier housing 43 to assist in aligning a selected screen with the condenser rear aperture 42 and securing it in the selected position.

In operation, slide 44 is moved within housing 43 along its longitudinal axis 50 using one of the handles 51 until one of the screens 46–49 is aligned with the rear aperture 42. Depending on the screen selected, a light beam directed toward the condenser rear aperture 42 will be effected accordingly. For example, if the full aperture opening 46 is aligned with the condenser rear aperture 42, then a light beam will reach the rear aperture 42 virtually unaffected. On the other hand, if the filter pair screen 48 is aligned with the rear aperture 42, then a light beam directed toward the condenser rear aperture 42, will be effectively divided in half by the filters 48a and 48b that comprise screen 48. Provided that complimentary filters to filters 48a and 48b are provided for the eyepieces of the microscope, the insertion of the screen 48 into the light beam path will produce a 3-D image for viewing.

To obtain a stereo pair photograph of a specimen viewed through screen 48, for example, through-aperture screens 47 and 49 are alternately aligned with the rear aperture 42 of the condenser 41 and a photograph taken through each screen.

The embodiment of the invention shown in FIGS. 4, 5, and 8 is capable of producing the same results as described in connection with the embodiment of FIGS. 2 and 3, but in an alternate and possibly more compact physical structure.

Screen 48, comprised of half circle filter 48a and half circle filter 48b can be any complimentary filters, such as polarizing filters or chromatic filters. The through-aperture screens 47 and 49 have the same geometric shape as each of the filter components 48a and 48b that comprise screen 48.

As mentioned previously in connection with the embodiment of FIGS. 2 and 3, a variety of filter and photographic through-aperture screen geometries can be employed in order to obtain different views of a specimen.

Figure 9:
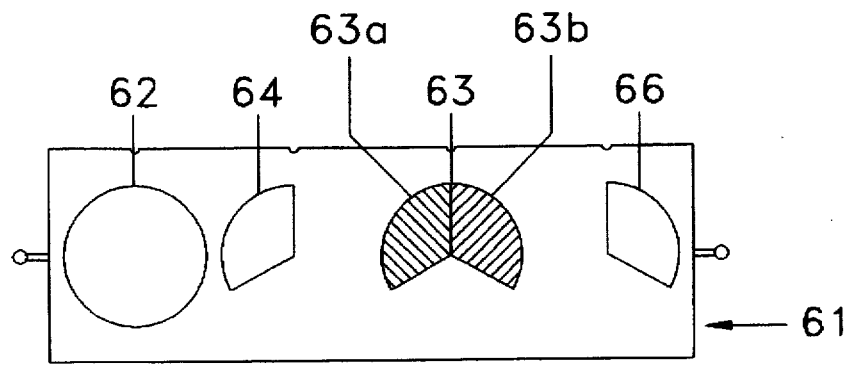
FIG. 9 is a plan view of another carrier slide for use with the condenser of FIG. 6, having a plurality of screens.

Referring to FIG. 9, a slide 61, similar to slide 44, has four screens, three of which have different geometric shapes than the slide of FIG. 8. Screen 62 is a through-aperture of roughly the same size as the rear aperture of the condenser and thus permits a light beam directed toward the condenser rear aperture 42 to pass through the condenser essentially unaffected. Filter screen 63 is comprised of adjacent sector filters 63a and 63b which share a common radius and which can produce a view of greater contrast and depth of field than the half circular filters 48a and 48b (FIG. 8). Screens 64 and 66 are through-aperture screens having the same geometric shape as each of the filter 63a and 63b and provide the screens for creating stereo pairs of an image viewed using filter 63.

If it is desirable to view a specimen with greater contrast, then slide 61 could be selected and inserted into housing 43 replacing any other slide which might have been previously used.

Figure 10:
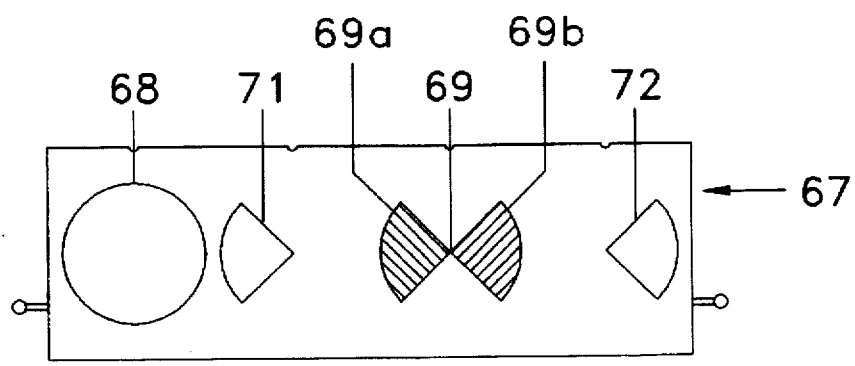
FIG. 10 is a plan view of a third carrier slide for use with the condenser of FIG. 6, having a plurality of screens.

Referring to FIG. 10, a rectangular opaque slide 67 includes screens of yet another geometry. A full rear aperture through-aperture screen 68 is provided to permit standard 2-D viewing. A 3-D filter screen 69 is comprised of a pair of sector filters 69a and 69b which are aligned such that they have contact at their apexes and are bisected by a line passing through their apexes which is parallel to the longitudinal axis 50 of slide 67. The particular geometry of screen filter pair 69 increases the separation between the images that comprise the 3-D view, thus increasing the parallax and consequently enhancing stereo depth perception, which is advantageous in viewing some specimens. Once again, stereo pair photographs can be created by the use of through-aperture screens 71 and 72, having the same geometric shape as each of filters 69a and 69b.

The filter geometries illustrated in FIGS. 8, 9, and 10, is by way of example only, and not exhaustive by any means. The advantages of the invention accrue by virtue of the combination with a single condenser of filter pair screens that create 3-D views and through-apertures for creating stereo pair photographs of the image as viewed through the filter pair screen. Using any one of the slides 44, 61, or 67, a microscope operator can, by merely positioning a slide, investigate an object by a standard 2-D view, a variety of 3-D views and take stereo pair photographs of any 3-D view observed, all without any other adjustment to the microscope.

Figure 6:
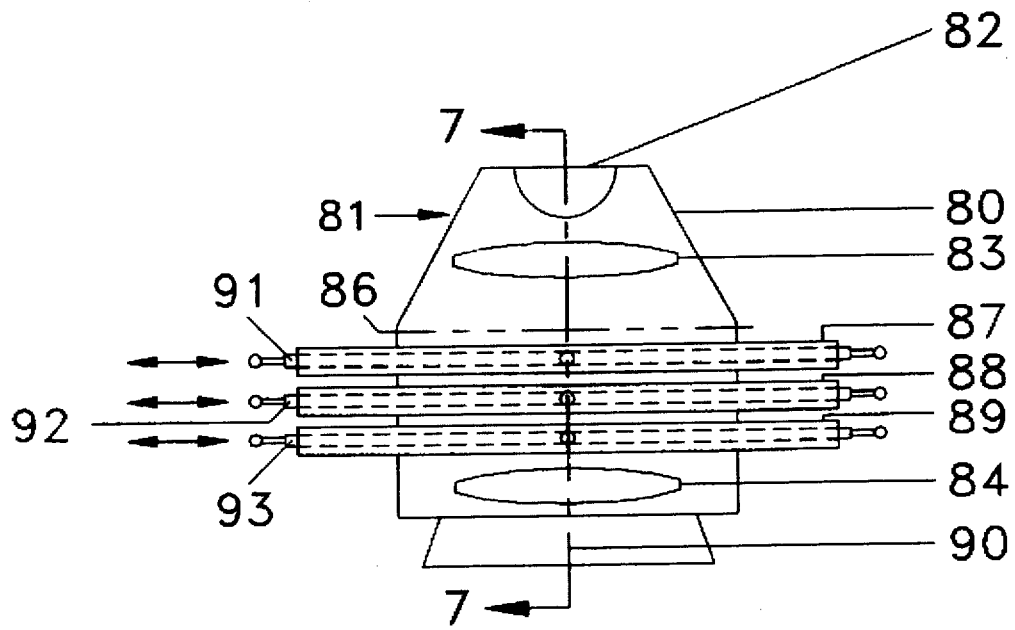
FIG. 6 is a mostly schematic side view illustration of a condenser lens of the present invention similar to that shown in FIG. 4 incorporating multiple slide carriers which are stacked.
Figure 7:
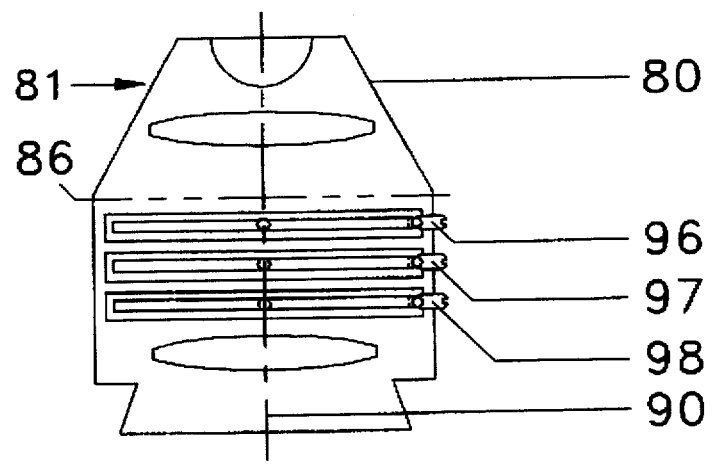
FIG. 7 is a section view of the condenser lens and carrier of the present invention taken along the line 7—7 of FIG. 6.

Referring to FIGS. 6 and 7, a transmitted light microscope condenser 81, is comprised of a plurality of optical elements 82, 83, and 84 having a common optical axis 90 supported within a condenser housing 80. The rear aperture of the condenser is indicated at 86 between elements 83 and 84 and has the same optical axis 90.

Integral with the condenser housing 80 are slide housings 87, 88, and 89, located in the condenser 81 between the rear aperture 86 and optical element 84. Each of housings 87, 88 and 89 includes an opaque screen slide 91, 92, and 93, respectively, which are slidable within their housings along their longitudinal axis, precisely as described in connection with the single housing and slide embodiment of FIGS. 4, 5, and 8. The housings 87, 88, and 89, are stacked, one over the other along the optical axis 90, and each slide 91, 92, and 93 has screens of unique geometry, such as those shown on FIGS. 8, 9, and 10. The advantage of this stacked slide embodiment is that any one of the three screen geometries described in connection with FIGS. 8, 9, and 10 (or any other three geometries, for that matter) are readily available without the necessity of removing one slide and replacing it with another. By aligning the full through-aperture screen of each slide (46,62 or 68) with the condenser rear aperture 86, standard 2-D viewing is available. From that alignment of the slides, any one slide can be positioned to locate its 3-D viewing screen (48, 63, or 69) into alignment with the rear aperture 86 of the condenser 81 for 3-D viewing. To take a stereo pair photograph, two of the slides are positioned to have their full through-aperture screen aligned with the rear aperture 86 and a through-aperture screen of the geometry of one of the filters (47, 49, 64, 66, 71, or 72) is aligned with the rear aperture 86 and a photograph taken. The use of layered screens (more than one operative screen interposed in the path of a light beam directed toward the condenser rear aperture) suggests interesting possibilities that are well within the teaching of the invention.

Even though the stacked housings 87, 88, and 89 are of necessity at different distances from the rear aperture 86 of the condenser 81, they are all sufficiently closed to the rear aperture to be effectively "at" the rear aperture for purposes of viewing the specimen. The slides themselves can be made from very thin material, such as leaflet material used in irises (0.01–0.02 inches thick) and therefore all close enough to the rear aperture to be effectively at the rear aperture for the purposes of the invention. Other materials and thicknesses are possible and within the scope of the invention.

Each of the housings 87, 88, and 89 has a detente cam 96, 97, and 98 respectively, which, as previously described, cooperates with the detentes in the slides (not shown in FIGS. 6 and 7) to enable alignment relative to the rear aperture 86.

While Applicant has illustrated an indexing mechanism utilizing a detente and detente cam, the invention is not so limited. Other and different mechanisms for accomplishing the same result would occur to those skilled in the art. The positioning of the slides or disc to select a particular screen to be operatively inserted into the optical path of the microscope could also be mechanically or electro-mechanically accomplished for precision and control. Such features are not a part of this invention.

It is customary, when using polarizing filters to create 3-D images (the advantage to polarizing filters over chromatic filters is that the possibility of color distortion is eliminated and thereby provides true color images) to align one filter such that its direction of polarization is parallel to the imaginary line 20 between the centers of the eyepiece lenses 17 and 18 with the direction of polarization of the other filter aligned perpendicular to the imaginary line 20. In this way the polarizing filters are at right angles to each other to create maximum polarization extinction for one channel of illumination and maximum transmission for the other channel of illumination. Corresponding filters in the binocular eyepieces if properly indexed to the screen filters permit only the light that passes through one of the filters to be seen by one eye while the other eye sees only the light from the other filter, thereby creating the 3-D effect. Polarizing filters so aligned, however, (perpendicular and parallel to an imaginary line between the centers of the eyepiece lenses) do not produce the 3-D effect in a microscope having a binocular head which includes prisms that permit adjustment of the interoccular distance. Because it is important to be able to adjust the interoccular distance of the binocular head (the distance between the centers of the eyepiece lenses) to match the interoccular distance of the observer, microscope heads having this feature are increasingly more prevalent. The prisms which allow this feature in the head, however, have the effect of neutralizing the distinction between polarized light which is aligned parallel and perpendicular to an imaginary line 20, (FIG. 1) between the eyepiece lenses of the binocular viewing head.

In the present invention, polarizing filters such as illustrated in FIGS. 3, 8, 9, and 10, are all aligned to be at a 45° angle to the imaginary line 20. They remain 90° to each other, but are neither parallel nor perpendicular to the imaginary line 20. When so positioned, binocular viewing heads with internal prisms for interoccular adjustability do not neutralize the polarizing effects and 3-D images can be seen. Thus, each of the filters illustrated, is shown to have an orientation which is 45° to the imaginary line between the ocular eyepieces (see FIG. 1) but 90° to each other to maintain maximum polarizing contrast.

In order for any filters to produce 3-D images for viewing, it is essential that complimentary filters be incorporated into the viewing head eyepieces. When the filters used are polarizing filters, the condenser filters and the eyepiece filters must be in proper alignment to achieve a good 3-D image to view.

Figure 11:
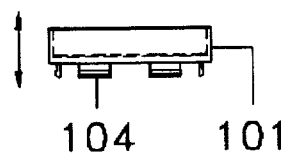
FIG. 11 is a side elevation view of a microscope eye piece polarizing filter.
Figure 12:
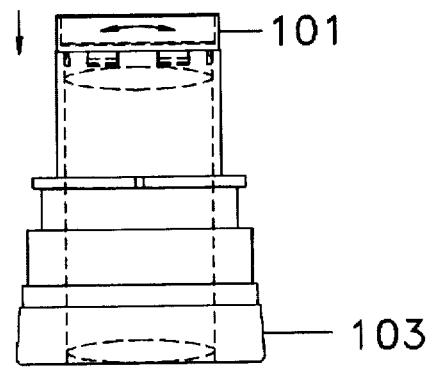
FIG. 12 is a side view of a microscope eye piece with the filter of FIG. 11 inserted therein.
Figure 13:
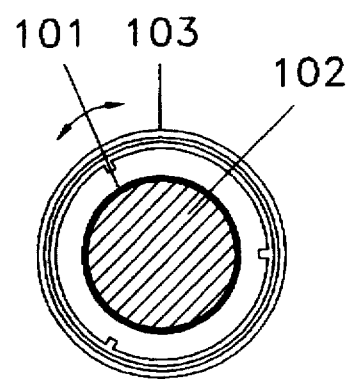
FIG. 13 is an end view of the microscope eye piece and filter of FIG. 12.
Figure 14:
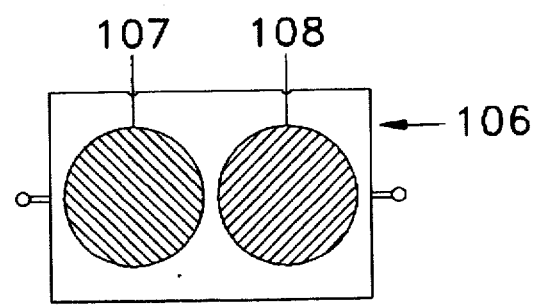
FIG. 14 is a plan view of a polarizing alignment slide.

Referring to FIGS. 11, 12, and 13, a polarizing filter 102 is mounted in an eyepiece filter cap 101 which is sized to press fit within the end of a microscope head eyepiece 103 and is rotatably secured therein by prongs 104 which are integral with and extend from filter cap 101. When the filter cap 101 is inserted into the eyepiece 103, as best seen in FIG. 12, it can be rotated to change the angle of polarization. Precise alignment of the filter 102 within the eyepiece 103 to match the orientation of the corresponding filter at the condenser rear aperture is achieved by use of a filter orientation slide 106, illustrated in FIG. 14.

Filter orientation slide 106 contains two circular screens, each containing a polarizing filter oriented at a different 45° angle (therefore 90° relative to each other) to an imaginary line 20 between the centers of the lenses of the binocular eyepiece head 16 (FIG. 1). The filters are oriented by inserting slide 106 into a condenser screen housing such as 43 (see FIG. 4) and the screen 107 aligned with the rear aperture 42 of the condenser. Light passing through filter 107 will be polarized in a direction dependent on the polar orientation of the filter (in this case 45°). An eyepiece, such as eyepiece 103 (see FIG. 11), equipped with a filter 102, will pass the most amount of light that comes through screen filter 107 when the orientation of screen filter 102 matches the orientation of screen filter 107. Conversely, none of the polarized light will pass through an eyepiece filter oriented 90° to the angle of polarization of the light. Once the maximum light is seen through the eyepiece by slowly rotating cap 101, the proper orientation is achieved. The polarizing angle of the screen filter in the other eyepiece is then similarly aligned by the same use of screen filter 108.

The condenser of the present invention permits the ready conversion of a standard 2-D microscope into a very flexible 3-D microscope by simply replacing a standard microscope condenser with the condenser of the present invention and the insertion (and alignment in the case of polarizing filters) of a filter cap in each eyepiece. Once these simple additions are made to the microscope, and without any other modifications of the microscope being necessary, an investigator has readily at hand the ability to create a variety of 3-D views of a specimen and to quickly and easily capture those images in stereo pair photographs. A variety of different screens additionally allows an investigator to enhance contrast, depth of field and parallax angle and consequently produce improved stereo depth perception.

What is claimed is:

1. A condenser lens system for use with a transmitted light microscope for taking stereo photographs of an image of a specimen, comprising in combination:

a condenser lens having a rear aperture through which a light beam can pass;

a carrier operatively associated with the condenser lens and selectively positionable relative to the rear aperture of the condenser lens;

a plurality of different light beam screens spaced apart on said carrier, said plurality of different light beam screens including a filter pair formed by two contrasting filters of a particular geometric shape, said filter pair operative when brought into alignment with the rear aperture of said condenser lens to effectively divide a light beam directed toward the rear aperture of said condenser lens into two contrastable light beams;

whereby movement of said carrier relative to said condenser lens permits selection of one of said plurality of light beam screens to be brought into alignment with the rear aperture of said condenser lens such that any light beam directed toward the rear aperture of said condenser lens will encounter said aligned light beam screen:

said plurality of light beam screens further including two through-apertures for taking stereo pair photographs wherein a first of said through-apertures is operative when brought into alignment with the rear aperture of said condenser lens toward which a light beam is directed to pass only a portion of the light beam and wherein the second of said through-apertures is operative when brought into alignment with the rear aperture of said condenser lens toward which a light beam is directed to pass only a portion of the light beam wherein the portion of the light beam passed by said first through aperture is different than the portion of the light beam passed by said second through aperture.

2. The condenser lens system of claim 1, wherein said first through-aperture for taking stereo pair photographs has the same geometric shape as one of the filters of said filter pair and said second through-aperture has the same geometric shape as the other filter of said filter pair.

3. The condenser lens system of claim 2 wherein the geometric shape of each filter of said filter pair, is a half circle.

4. The condenser lens system of claim 2 wherein the geometric shape of each filter of said filter pair is a sector of a circle.

5. The condenser lens system of claim 4 wherein the filters of said filter pair have a common radius.

6. The condenser lens system of claim 2 wherein said filter pair is two polarization filters aligned to have different directions of polarization.

7. The condenser lens system of claim 3 wherein said filter pair is two polarization filters aligned to have different directions of polarization.

8. The condenser lens system of claim 4 wherein said filter pair is two polarization filters aligned to have different directions of polarization.

9. The condenser lens system of claim 2, wherein said filter pair is two filters of different colors.

10. The condenser lens system of claim 3, wherein said filter pair is two filters of different colors.

11. The condenser lens system of claim 4, wherein said filter pair is two filters of different colors.

12. The condenser lens system of claim 6 wherein the microscope is further described as having a pair of spaced-apart eyepiece lenses for viewing a specimen and the direction of polarization of each of said filters of said filter pair is neither parallel nor perpendicular to an imaginary line between the eyepiece lenses.

13. The condenser lens system of claim 12 wherein the direction of polarization of each filter of said filter pair is approximately 45 degrees to the imaginary line between the eyepiece lenses and approximately 90 degrees to one another.

14. The condenser lens system of claim 2 further described by said condenser lens having an optical axis which passes through the center of its rear aperture and wherein said carrier comprises:

a disc having a radius disposed in a plane perpendicular to the condenser optical axis and having an axis of rotation parallel to but displaced from the optical axis of the condenser lens a distance less than the radius of said disc whereby rotation of said disc sequentially aligns said screens with the rear aperture of said condenser lens.

15. The condenser lens system of claim 2 further described by said condenser lens having an optical axis which passes through the center of its rear aperture and wherein said carrier comprises:

a slide member movable in a plane generally perpendicular to, and along a path that includes, the optical axis of said condenser lens whereby said screens are selectively aligned with the rear aperture of said condenser lens by movement of said slide member.

16. The condenser lens system of claim 2 further described by said condenser lens having an optical axis which passes through the center of its rear aperture and wherein said carrier comprises:

a plurality of slide members each having a longitudinal axis along which it is movable and along which are located screens at spaced intervals whereby said screens are selectively aligned with the rear aperture of the condenser lens by movement of said slide members, said slide members being stacked along the optical axis, one over the other.

17. The condenser lens system of claim 16 wherein each said slide member further includes a circular through-aperture.

18. The condenser lens system of claim 16 wherein each slide member includes at least one filter pair and two through-apertures.

19. The condenser lens system of claim 12 wherein said plurality of different light beam screens are further described as including:

a first polarizing alignment filter with its direction of polarization aligned with one filter of said filter pair;

a second polarizing alignment filter with its direction of polarization aligned with the other filter of said filter pair; and a polarization direction-adjustable polarizing filter cap operatively disposed at each of said eyepieces.

20. The condenser lens system of claim 13 wherein said plurality of different light beam screens are further described as including:

a first polarizing alignment filter with its direction of polarization aligned with one filter of said filter pair;

a second polarizing alignment filter with its direction of polarization aligned with the other filter of said filter pair; and a polarization direction-adjustable polarizing filter cap operatively disposed at each of said eyepiece lenses.

21. The condenser lens system of claim 1 wherein the microscope is further described as having a pair of spaced-apart eyepiece lenses for viewing a specimen and said filter pair are polarizing filters wherein the direction of polarization of each of said filters of said filter pair is neither parallel nor perpendicular to an imaginary line between the eyepiece lenses.

22. The condenser lens system of claim 21 wherein the direction of polarization of each filter of said filter pair is approximately 45 degrees to the imaginary line between the eyepiece lenses and approximately 90 degrees to one another.

23. The condenser lens of claim 1 further described by said condenser lens having an optical axis which passes through the center of its rear aperture and wherein said carrier comprises:

a slide member movable in a plane generally perpendicular to, and along a path that includes, the optical axis of said condenser lens whereby said screens are selectively aligned with the rear aperture of said condenser lens by movement of said slide member.

24. The condenser lens system of claim 1 further described by said condenser lens having an optical axis which passes through the center of its rear aperture and wherein said carrier comprises:

a plurality of slide members each having a longitudinal axis along which it is movable and along which are located screens at spaced intervals whereby said screens are selectively aligned with the rear aperture of the condenser lens by movement of said slide members, said slide members being stacked along the optical axis, one over the other.

25. The condenser lens system of claim 24 wherein each said slide member further includes a circular through-aperture.

* * * * *